United States Patent [19]

Vourlis

[11] Patent Number: 5,432,030
[45] Date of Patent: Jul. 11, 1995

[54] LI/FES2 CELL EMPLOYING A SOLVENT MIXTURE OF DIOX, DME AND 3ME2OX WITH A LITHIUM-BASED SOLUTE

[75] Inventor: Harry Vourlis, Rocky River, Ohio

[73] Assignee: Eveready Battery Company, Inc., St. Louis, Mo.

[21] Appl. No.: 161,378

[22] Filed: Dec. 2, 1993

[51] Int. Cl.⁶ .............................................. H01M 4/58
[52] U.S. Cl. ................................... 429/197; 429/217
[58] Field of Search ......................... 429/197, 217, 221

[56] References Cited

U.S. PATENT DOCUMENTS

| | | | |
|---|---|---|---|
| H829 | 10/1990 | Behl | 429/194 |
| 3,423,242 | 1/1969 | Meyers et al. | 136/6 |
| 3,607,413 | 9/1971 | Buzzelli | 136/76 |
| 3,762,954 | 10/1973 | Metcalfe, III et al. | 136/22 |
| 3,778,310 | 12/1973 | Garth | 136/100 |
| 3,811,947 | 5/1974 | Metcalfe, III et al. | 136/6 LF |
| 3,957,532 | 5/1976 | Settle et al. | 136/75 |
| 3,996,069 | 12/1976 | Kronenberg | 429/197 |
| 4,071,665 | 1/1978 | Garth | 429/197 |
| 4,124,747 | 11/1978 | Murer et al. | 429/210 |
| 4,129,691 | 12/1978 | Broussely | 429/197 |
| 4,228,224 | 10/1980 | Heredy et al. | 429/112 |
| 4,228,227 | 10/1980 | Saathoff et al. | 429/194 |
| 4,275,129 | 6/1981 | Kappus et al. | 429/112 |
| 4,284,692 | 8/1981 | Rao et al. | 429/194 |
| 4,335,191 | 6/1982 | Peled | 429/94 |
| 4,416,960 | 11/1983 | Eustace et al. | 429/194 |
| 4,436,796 | 3/1984 | Huggins et al. | 429/112 |
| 4,450,214 | 5/1984 | Davis | 429/194 |
| 4,482,613 | 11/1984 | Turchan et al. | 429/53 |
| 4,489,143 | 12/1984 | Gilbert et al. | 429/103 |
| 4,489,144 | 12/1984 | Clark | 429/196 |
| 4,532,195 | 7/1985 | Weddigen | 429/213 |
| 4,717,634 | 1/1988 | Daifuku et al. | 429/213 |
| 4,728,590 | 3/1988 | Redey | 429/221 |
| 4,803,137 | 2/1989 | Miyazaki et al. | 429/194 |
| 4,808,499 | 2/1989 | Nagai et al. | 429/218 |
| 4,814,242 | 3/1989 | Maxfield et al. | 429/217 |
| 4,861,573 | 8/1989 | deNeufville et al. | 423/464 |
| 4,952,330 | 8/1990 | Leger et al. | 252/62.2 |
| 4,956,247 | 9/1990 | Miyazaki et al. | 429/194 |
| 5,229,227 | 7/1993 | Webber | 429/197 |

FOREIGN PATENT DOCUMENTS

| | | | |
|---|---|---|---|
| 1174274 | 9/1984 | Canada | H01M 6/16 |
| 0049082 | 4/1982 | European Pat. Off. | H01M 4/50 |
| 68492 | 1/1983 | European Pat. Off. | 429/217 |
| 574019 | 12/1993 | European Pat. Off. | H01M 4/62 |
| 2252658 | 6/1975 | France | H01M 6/16 |
| 48-33811 | 10/1973 | Japan . | |
| 56-38744 | 4/1981 | Japan | H01M 6/16 |
| 57-50772 | 3/1982 | Japan | H01M 6/16 |
| 59-90364 | 5/1984 | Japan | 429/217 |
| 59-173961 | 10/1984 | Japan | H01M 4/62 |
| 59-173977 | 10/1984 | Japan | H01M 10/40 |
| 63-226881 | 9/1988 | Japan . | |
| 3257183 | 10/1988 | Japan | H01M 6/16 |
| 1-134873 | 5/1989 | Japan | H01M 10/40 |
| 1-232661 | 9/1989 | Japan . | |
| 3-222258 | 10/1991 | Japan | H01M 4/62 |
| 1510642 | 5/1978 | United Kingdom | H01M 10/39 |
| 1583981 | 2/1981 | United Kingdom | H01M 10/39 |
| 2087132 | 5/1982 | United Kingdom | H01M 10/40 |
| 2157065 | 10/1985 | United Kingdom | H01M 10/39 |
| WO92/13366 | 8/1992 | WIPO | H01M 10/39 |

Primary Examiner—Stephen Kalafut
Attorney, Agent, or Firm—Robert W. Welsh; Richard C. Cooper

[57] ABSTRACT

An electrochemical cell, such as a rechargeable Li/-FeS2 cell, employing an improved electrolyte comprising a mixture of 3-methyl-2-oxazolidone in a range of 27 to 33 percent by volume and a volume ratio of 1,3-dioxolane to 1,2-dimethoxyethane of between 0.8 to 2.2 and 1.1 to 1.9 with a solute such as LiI or LiCF3SO3.

20 Claims, No Drawings 5,432,030

LI/FES$_2$ CELL EMPLOYING A SOLVENT MIXTURE OF DIOX, DME AND 3ME2OX WITH A LITHIUM-BASED SOLUTE

FIELD OF THE INVENTION

The invention relates to an electrochemical cell, such as a rechargeable Li/FeS$_2$ cell, employing an improved electrolyte comprising a solvent mixture of 1,3-dioxolane (DIOX), 1,2-dimethoxyethane (DME) and 3-methyl-2-oxazolidone (3Me2Ox) with a lithium-based solute such as LiI or LiCF$_3$SO$_3$.

BACKGROUND OF THE INVENTION

The development of high energy battery systems requires the compatibility of electrolytes possessing desirable electrochemical properties with highly reactive anode materials, such as lithium, sodium and the like, and the efficient use of high energy density cathode materials, such as FeS$_2$, and the like. The use of aqueous electrolytes is precluded in these systems since the anode materials are sufficiently active to react with water chemically. It has, therefore, been necessary, in order to realize the high energy density obtainable through use of these highly reactive anodes and high energy density cathodes, to turn to the investigation of nonaqueous electrolyte systems and more particularly to nonaqueous organic electrolyte systems.

A multitude of solutes is known and recommended for use but the selection of a suitable solvent has been particularly troublesome since many of those solvents which are used to prepare electrolytes sufficiently conductive to permit effective ion migration through the solution are reactive with the highly reactive anodes described above. Most investigators in this area, in search of suitable solvents, have concentrated on aliphatic and aromatic nitrogen- and oxygen-containing compounds with some attention given to organic sulfur-, phosphorus- and arsenic-containing compounds. The results of this search have not been entirely satisfactory since many of the solvents investigated still could not be used effectively with extremely high energy density cathode materials and were sufficiently corrosive to lithium anodes to prevent efficient performance over any length of time.

U.S. Pat. No. 3,996,069 discloses a nonaqueous cell utilizing a highly active metal anode, a solid cathode selected from the group consisting of FeS$_2$, Co$_3$O$_4$, V$_2$O$_5$, Pb$_3$O$_4$, In$_2$S$_3$, and CoS$_2$, and a liquid organic electrolyte based on 3-methyl-2-oxazolidone in conjunction with a low viscosity cosolvent and a selected solute.

U.S. Pat. No. 4,450,214 discloses a lithium nonaqueous cell employing an FeS$_2$-containing or MnO$_2$-containing cathode and an organic electrolyte and wherein a lithium halide, such as LiCl, is added to the cell to improve the voltage level on pulse discharge of the cell particularly at low temperatures and/or to stabilize the open circuit voltage.

U.S. Pat. No. 4,416,960 discloses an improved electrolyte for a Li/TiS$_2$ current producing system, such as a battery, featuring at least one lithium solute of the general formula LiXF$_a$, where X is selected from a group consisting of B, P, Sb, and As, and wherein a is 4 for B and 6 for P, Sb and As. The solute(s) are supported in a solvent consisting of at least 1,3-dioxolane, and more particularly in a mixture of 1,3-dioxolane (DIOX) and 1,2 dimethoxyethane (DME) from 100/0 to 40/60 by weight.

U.S. Pat. No. 4,129,691 discloses electrolytes for use in lithium primary cells made from a mixture of three organic solvents and an alkaline solute. The first solvent is chosen to have a dielectric constant greater than 35 (e.g., propylene carbonate), the second solvent is a linear polyether with its ether functional groups in the $\alpha$ position (e.g., 1-2-dimethoxyethane) and the third solvent has a high solvation power for dissolving large quantities of the alkaline salt (e.g. 1-3-dioxolane). The solvents are so chosen that the conductivity maxima of the electrolytes that would be obtained by mixing the solvents in pairs are higher than the conductivity maxima of the electrolytes that would be obtained by using each of the solvents on its own. The positive electrode cell using the electrolyte may be cupric oxide or ferrous disulfide.

While the theoretical energy, i.e., the electrical energy potentially available from a selected anode-cathode couple is relatively easy to calculate, there is a need to choose a nonaqueous electrolyte for such a couple that permits the actual energy produced by an assembled battery to approach the theoretical energy. The problem usually encountered is that it is practically impossible to predict in advance how well, if at all, a nonaqueous electrolyte will function with a selected couple. Thus a cell must be considered as a unit having three parts—a cathode, an anode and an electrolyte—and it is to be understood that the parts of one cell are not predictably interchangeable with parts of another cell. This problem is particularly true of rechargeable cells in which the cells can be discharged and then charged so that the usable cell life can be extended for many charging cycles.

It is an object of the present invention to provide a Li/FeS$_2$ cell with a specific electrolyte composed of three solvents along with a lithium-based solute that will enable the cell to be a rechargeable cell.

Another object of the present invention is to provide a rechargeable Li/FeS$_2$ cell with an electrolyte composed of a mixture of 1,3-dioxolane, 1,2-dimethoxyethane and 3-methyl-2-oxazolidone with a solute such as LiI or LiCF$_3$SO$_3$.

It is another object of the present invention to provide an electrolyte for a rechargeable Li/FeS$_2$ cell in which the electrolyte solvent comprises at least 27 to 33 percent by volume 3-methyl-2-oxazolidone and a ratio volume between 0.8 to 2.2 and 1.1 to 1.9 of 1,3-dioxolane to 1,2-dimethoxyethane mixed with a solute of LiI or LiCF$_3$SO$_3$.

It is another object of the present invention to provide a cost effective rechargeable Li/FeS$_2$ cell that can be charged and discharged for many cycles.

SUMMARY OF THE INVENTION

The invention relates to an electrochemical cell comprising a pure lithium or lithium alloy anode, an FeS$_2$ cathode and an electrolyte comprising a solvent mixture of 1,3-dioxolane, 1,2-dimethoxyethane and 3-methyl-2-oxazolidone with at least one solute selected from the group consisting of LiI and LiCF$_3$SO$_3$ and wherein said 3-methyl-2-oxazolidone is present in the solvent mixture between 27 and 33 percent by volume and the volume ratio of said 1,3-dioxolane to said 1,2-dimethoxyethane is between 0.8 to 2.2 and 1.1 to 1.9. In the preferred embodiment of the lithium/FeS$_2$ cell, the solvent component of the electrolyte would comprise about 29 to 31 percent and most preferably about 30 percent by volume 3-methyl-2-oxazolidone and a volume ratio of 1,3-dioxolane to 1,2-dimethoxyethane between 0.9 to 2.1 and 1.2 to 1.8 and most preferably about 1 to 2. It is believed that amounts of 3-methyl-2-oxazolidone above 34 volume percent would not be desirable because of the tendency of this solvent to form a film on lithium anodes which, when present in an excessive amount, can depress high rate performance. The preferred solute for the cell is LiI although $LiCF_3SO_3$ is also desirable. This unique composition of the electrolyte when used in a $Li/FeS_2$ cell system will enable the cell to be charged and discharged over many cycles, thus providing a good rechargeable cell.

Liquid organic 3-methyl-2-oxazolidone material,

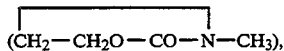

is an excellent nonaqueous solvent because of its high dielectric constant, chemical inertness to battery components, wide liquid range and low toxicity. However, it has been found that when metal salts are dissolved in liquid 3Me2Ox, the viscosity of the solution becomes too high for its efficient use as an electrolyte for nonaqueous cell applications other than those requiring very low current drains. It has been discovered that the employment of a narrow volume range of 3-methyl-2-oxazolidone along with a narrow volume ratio of 1,3-dioxolane to 1,2-dimethoxyethane with a specific solute of LiI and/or $LiCF_3SO_3$ will provide an excellent electrolyte for an $Li/FeS_2$ cell such that said cell system can be charged and discharged over many cycles. The narrow range of percent volume of the three solvents in the electrolyte has been found to provide a rechargeable $Li/FeS_2$ cell with the capability of being charged-discharged over many cycles before overcharge of the cell occurs. Overcharge occurs when the capacity imparted to the cell during charging cannot be completely recovered during discharging.

As used herein a lithium anode shall mean a pure lithium anode or a lithium alloy containing, for example, aluminum in an amount of 0.03 to 1.0 weight percent aluminum. Molar shall mean moles per liter of the solvent.

EXAMPLE 1

Several cells were prepared, each using a pure lithium anode and an $FeS_2$ cathode mix containing 86 weight percent $FeS_2$ with the remainder being conductive material and a binder. The solute in the electrolyte of each cell was $LiCF_3SO_3$ (triflate) in a 1.5 molar concentration (moles per liter of the solvent) with various volume percents of 1,3-dioxolane (DIOX), 1,2-dimethoxyethane (DME) and/or 3-methyl-2-oxazolidone. The cells were discharged at 200 mA to a 1.0 volt cutoff and then charged at 60 mA to a 2.2 volt cutoff. The cells were all cycled until overcharge occurred unless overcharge did not occur (Samples F and G). The results of the test are shown in Table 1.

TABLE 1

| Sample | Volume Percent of Electrolyte Solvent | Cycles to Overcharge |
| --- | --- | --- |
| A | 25% DIOX; 75% DME | 7 |
| B | 50% DIOX; 40% DME; 10% 3Me2Ox | 26 |
| C | 45.7% DIOX; 34.3% DME; 20% 3Me2Ox | 33 |
| D | 20% DIOX; 60% DME; 20% 3Me2Ox | 34 |
| E | 19% DIOX; 56% DME; 25% 3Me2Ox | 33 |
| F | 40% DIOX; 30% DME; 30% 3Me2Ox | did not overcharge |
| G | 40% DIOX; 30% DME; 30% 3Me2Ox | did not overcharge |

The data show that the electrolyte with the 30 volume percent 3Me2Ox showed the best result.

EXAMPLE. 2

Similar cells as in Example 1 were prepared except that the electrolyte was composed of various volume amounts of DIOX, DME and 3Me2Ox as shown in Table 2. The cells were tested for open circuit voltage (OCV), impedance, closed circuit voltage (CCV) and flash amperage. The flash amperage was determined by subjecting the cell to a 200 microsecond pulse across a 0.01 ohm resistor. The data observed are shown in Table 2 where AVG equals the average reading for 15 cells and STD equals the standard deviation between the 15 cells tested.

TABLE 2

| SAMPLE | ELECTROLYTE | | OCV | IMPEDANCE | | | CCV | FLASH AMPS |
| --- | --- | --- | --- | --- | --- | --- | --- | --- |
| | | | | 1 KHz | 10 KHz | 10 Hz | | |
| *1 | ELECTROLYTE WITH $LiCF_3SO_3$ IN 40% DIOX/30% DME/30% 3Me2Ox | AVG. STD | 1.743 0.001 | 0.358 0.037 | 0.179 0.035 | 0.759 0.058 | 1.529 0.012 | 6.92 0.95 |
| *2 | ELECTROLYTE WITH $LiCF_3SO_3$ IN 23.3% DIOX/46.7% DME/30% 3Me2Ox | AVG. STD | 1.757 0.002 | 0.344 0.018 | 0.170 0.016 | 0.794 0.057 | 1.537 0.006 | 7.12 0.58 |
| *3 | ELECTROLYTE WITH LiI IN 23.3% DIOX/46.7% DME/30% 3Me2Ox | AVG. STD | 1.751 0.003 | 0.327 0.032 | 0.165 0.025 | 0.720 0.024 | 1.530 0.016 | 7.31 0.83 |
| **4 | ELECTROLYTE WITH $LiCF_3SO_3$ IN 40% DIOX/30% DME/30% 3Me2Ox | AVG. STD | 1.746 0.002 | 0.348 0.026 | 0.178 0.025 | 0.756 0.073 | 1.53 0.014 | 6.95 0.78 |
| **5 | ELECTROLYTE WITH $LiCF_3SO_3$ IN 23.3% DIOX/46.7% DME/30% 3Me2Ox | AVG. STD | 1.757 0.004 | 0.346 0.032 | 0.182 0.027 | 0.738 0.079 | 1.543 0.015 | 6.90 0.76 |
| **6 | ELECTROLYTE WITH LiI IN 23.3% DIOX/46.7% | AVG. STD | 1.753 0.004 | 0.331 0.035 | 0.178 0.027 | 0.730 0.086 | 1.528 0.017 | 7.18 0.81 |

TABLE 2-continued

| SAMPLE | ELECTROLYTE | OCV | IMPEDANCE | | | CCV | FLASH AMPS |
|---|---|---|---|---|---|---|---|
| | | | 1 KHz | 10 KHz | 10 Hz | | |
| | DME/30% 3Me2Ox | | | | | | |

*Cathode with 1.0 percent by weight ethylene-propylene copolymer (COPO) binder plus 0.5 percent by weight polyethylene oxide (PEO).
**Cathode with 1.36 percent by weight ethylene-propylene copolymer binder.

The data shown in Table 2 show that samples 3 and 6 with the solute LiI provided lower impedance and higher flash amperes than did samples 2 and 5 with the solute $LiCF_3SO_3$. Thus cells with the LiI solute are preferable over the cells with the $LiCF_3SO_3$ solute.

EXAMPLE 3

Additional cell samples 1 to 6 as disclosed in Table 2 were prepared and then discharged at different discharge currents until a cutoff voltage of 1 volt was reached. Each cell was then charged at 60 mA until a cutoff voltage of 2.2 volts was reached. The number of charge-discharge cycles (CYC) until overcharge was detected were noted. These data in addition to the cumulative ampere hour capacity delivered by each sample cell and the calculated figure of merit (FOM) are shown in Table 3.

$$FOM = \frac{\text{total cumulative AH capacity over cycle life}}{\text{theoretical cathode capacity}}$$

TABLE 3

| SAMPLE | DISCHG CURRENT | CYC | CUM AH | FOM |
|---|---|---|---|---|
| 1 | 200 mA | 27 | 32.0 | 10.81 |
| 2 | | 33 | 37.25 | 12.80 |
| 3 | | 41 | 44.88 | 15.25 |
| 4 | | 29 | 35.19 | 12.55 |
| 5 | | 32 | 38.01 | 13.75 |
| 6 | | 44 | 4760 | 16.85 |
| 1 | 400 mA | 31 | 36.31 | 12.40 |
| 2 | | 40 | 45.0 | 15.52 |
| 3 | | 37 | 38.86 | 13.14 |
| 4 | | 34 | 39.51 | 14.07 |
| 5 | | 43 | 45.02 | 16.00 |
| 6 | | 48 | 48.40 | 17.08 |
| 1 | 600 mA | 36 | 39.77 | 13.39 |
| 2 | | 44 | 46.12 | 15.86 |
| 3 | | 42 | 43.67 | 14.80 |
| 4 | | 45 | 46.07 | 16.50 |
| 5 | | 45 | 46.16 | 16.45 |
| 6 | | 51 | 49.90 | 17.74 |
| 4 | 1200 mA | 42 | 39.80 | 14.25 |
| 5 | | 44 | 42.80 | 15.20 |
| 6 | | 52 | 47.17 | 16.72 |

The data show that the cycles, cumulative ampere hours and FOM were better for the cells employing an electrolyte with a ratio of DIOX to DME of about 1 to 2 (samples 2, 3, 5 and 6) over the cells employing an electrolyte with a ratio of DIOX to DME of 4 to 3 (samples 1 and 4) which are outside the ratio range of the subject invention. As in Example 2, the sample cells 3 and 6 employing a solute of LiI had better cycle life, cumulative ampere hours and FOM over the sample cells 2 and 5 which employed a solute of $LiCF_3SO_3$ except for sample 3 in the 400 mA and 600 mA discharge tests, which values were slightly lower than expected.

EXAMPLE 4

Similar sample cells were prepared as in Example 2 using the electrolyte of sample cell 3 but with a 1.0 molar LiI concentration for sample cells 7 and 8. Sample cells 9 and 10 used the same solvent mixture but with 1.5 moles of LiI per liter of the solvent. The cathodes for the cells employed a binder of 1.5 percent by weight ethylene-propylene copolymer (COPO) and 0.5 percent by weight PEO and the current collector was either stainless steel (SS) or copper (Cu). The open circuit voltage, impedance, closed circuit voltage and flash amperes were measured for thirteen cells in each test lot. The data obtained are shown in Table 4.

TABLE 4

| Sample | Current Collector | | OCV | IMPEDANCE | | | CCV | FLASH AMPS |
|---|---|---|---|---|---|---|---|---|
| | | | | 1 KHz | 10 KHz | 10 Hz | | |
| 7 | SS | AVG | 1.765 | 0.346 | 0.181 | 0.853 | 1.538 | 6.01 |
| | | STD | 0.001 | 0.026 | 0.022 | 0.105 | 0.026 | 1.41 |
| 8 | Cu | AVG | 1.746 | 0.282 | 0.143 | 0.703 | 1.543 | 7.96 |
| | | STD | 0.001 | 0.009 | 0.009 | 0.082 | 0.012 | 0.47 |
| 9 | SS | AVG | 1.770 | 0.301 | 0.164 | 0.580 | 1.582 | 7.95 |
| | | STD | 0.003 | 0.031 | 0.025 | 0.081 | 0.016 | 0.75 |
| 10 | Cu | AVG | 1.748 | 0.240 | 0.130 | 0.472 | 1.594 | 9.24 |
| | | STD | 0.004 | 0.037 | 0.024 | 0.099 | 0.024 | 1.15 |

The data in Table 4 show that the use of a conductive copper cathode collector in sample cells 8 and 10 provided a lower impedance and higher flash current over the use of a stainless steel cathode collector in sample cells 7 and 9.

While the present invention has been described with reference to many particular details thereof, it is not intended that these details shall be construed as limiting the scope of this invention.

What is claimed:

1. A rechargeable electrochemical cell comprising a lithium anode, an $FeS_2$ cathode and an electrolyte comprising a solvent mixture of 1,3-dioxolane, 1,2-dimethoxyethane and 3-methyl-2-oxazolidone with at least one solute selected from the group consisting of LiI and $LiCF_3SO_3$ and wherein said 3-methyl-2-oxazolidone is present in the solvent mixture between 27 and 33 percent by volume and the volume ratio of said 1,3-dioxolane to said 1,2-dimethoxyethane is between 0.8 to 2.2 and 1.1 to 1.9.

2. The electrochemical cell of claim 1 wherein said 3-methyl-2-oxazolidone is present in the solvent between 29 and 31 percent by volume and the volume ratio of said 1,3-dioxolane to said 1,2-dimethoxyethane is between 0.9 to 2.1 and 1.2 to 1.8.

3. The electrochemical cell of claim 2 wherein said 3-methyl-2-oxazolidone is present in the solvent about 30 percent by volume and the volume ratio of said 1,3-dioxolane to said 1,2-dimethoxyethane is about 1 to 2.

4. The electrochemical cell of claim 1 wherein the solute is LiI.

5. The electrochemical cell of claim 1 wherein the solute is $LiCF_3SO_3$.

6. The electrochemical cell of claim 2 wherein the solute is LiI.

7. The electrochemical cell of claim 2 wherein the solute is $LiCF_3SO_3$.

8. The electrochemical cell of claim 1 wherein the $FeS_2$ cathode contains a binder of ethylene-propylene copolymer.

9. An electrochemical cell comprising a lithium anode, an $FeS_2$ cathode and an electrolyte comprising a solvent mixture of 1,3-dioxolane, 1,2-dimethoxyethane and 3-methyl-2-oxazolidone with at least one solute selected from the group consisting of LiI and $LiCF_3SO_3$ and wherein said 3-methyl-2-oxazolidone is present in the solvent mixture between 27 and 33 percent by volume and the volume ratio of said 1,3-dioxolane to said 1,2-dimethoxyethane is between 0.8 to 2.2 and 1.1 to 1.9; the $FeS_2$ cathode containing a binder of ethylene-propylene copolymer; and the $FeS_2$ cathode further containing polyethylene oxide.

10. The electrochemical cell of claim 8 wherein said 3-methyl-2-oxazolidone is present in the solvent between 29 and 31 percent by volume and the volume ratio of said 1,3-dioxolane to said 1,2-dimethoxyethane is between 0.9 to 2.1 and 1.2 to 1.8.

11. The electrochemical cell of claim 9 wherein said 3-methyl-2-oxazolidone is present in the solvent between 29 and 31 percent by volume and the volume ratio of said 1,3-dioxolane to said 1,2-dimethoxyethane is between 0.9 to 2.1 and 1.2 to 1.8.

12. The electrochemical cell of claim 3 wherein the solute is LiI.

13. The electrochemical cell of claim 3 wherein the solute is $LiCF_3SO_3$.

14. The electrochemical cell of claim 12 wherein the $FeS_2$ cathode contains a binder of ethylene-propylene copolymer.

15. An electrochemical cell comprising a lithium anode, an $FeS_2$ cathode and an electrolyte comprising a solvent mixture of 1,3-dioxolane, 1,2-dimethoxyethane and 3-methyl-2-oxazolidone with at least one solute selected from the group consisting of LiI and $LiCF_3SO_3$ and wherein said 3-methyl-2-oxazolidone is present in the solvent about 30 percent by volume and the volume ratio of said 1,3-dioxolane to said 1,2-dimethoxyethane is about 1 to 2;

the solute being LiI;

the $FeS_2$ cathode containing a binder of ethylene-propylene copolymer; and the $FeS_2$ cathode further containing polyethylene oxide.

16. The electrochemical cell of claim 13 wherein the $FeS_2$ cathode contains a binder of ethylene-propylene copolymer.

17. An electrochemical cell comprising a lithium anode, an $FeS_2$ cathode and an electrolyte comprising a solvent mixture of 1,3-dioxolane, 1,2-dimethoxyethane and 3-methyl-2-oxazolidone with at least one solute selected from the group consisting of LiI and $LiCF_3SO_3$ and wherein said 3-methyl-2-oxazolidone is present in the solvent about 30 percent by volume and the volume ratio of said 1,3-dioxolane to said 1,2-dimethoxyethane is about 1 to 2;

the solute being $LiCF_3SO_3$;

the $FeS_2$ cathode containing a binder of ethylene-propylene copolymer; and the $FeS_2$ cathode further containing polyethylene oxide.

18. The electrochemical cell of claim 1 wherein the cell employs a cathode current collector selected from the group consisting of stainless steel and copper.

19. The electrochemical cell of claim 18 wherein said 3-methyl-2-oxazolidone is present in the solvent between 29 and 31 percent by volume and the volume ratio of said 1,3-dioxolane to said 1,2-dimethoxyethane is between 0.9 to 2.1 and 1.2 to 1.8.

20. The electrochemical cell of claim 19 wherein the solute is LiI, the current collector is copper and the $FeS_2$ cathode contains a binder of ethylene-propylene copolymer.

* * * * *